United States Patent [19]

Heims

[11] Patent Number: 4,836,564
[45] Date of Patent: Jun. 6, 1989

[54] ROAD-FINISHING MACHINE

[75] Inventor: Dirk Heims, Bad Münder, Fed. Rep. of Germany

[73] Assignee: ABG Werke GmbH, Hameln, Fed. Rep. of Germany

[21] Appl. No.: 158,935

[22] Filed: Feb. 22, 1988

[30] Foreign Application Priority Data

Feb. 25, 1987 [DE] Fed. Rep. of Germany ... 8702877[U]

[51] Int. Cl.$^4$ ........................ B60G 19/00; E01C 19/18
[52] U.S. Cl. .................................. 280/6.12; 280/709; 180/41; 404/84
[58] Field of Search .............. 280/6.1, 6 R, 6 H, 707, 280/714; 404/84; 172/406, 446, 450; 180/39; 160/41

[56] References Cited

U.S. PATENT DOCUMENTS

| | | | |
|---|---|---|---|
| 2,914,338 | 11/1959 | Kress | 280/709 |
| 3,140,098 | 7/1964 | Broadwell | 280/6 H |
| 3,989,402 | 11/1976 | James, III | 404/84 |
| 4,152,004 | 5/1979 | Schroder | 280/6 H |
| 4,236,591 | 12/1980 | Molby | 280/6 H |

Primary Examiner—Richard A. Bertsch
Attorney, Agent, or Firm—Frishauf, Holtz, Goodman & Woodward

[57] ABSTRACT

A road-finishing machine provided with a level-compensation arrangement. A directional wheel installed on each side of a frame includes an axle to which a vertical pin is attached. The pin is slidably and rotatably accomodated with a cylinder housing having a hydraulic fluid-filled chamber therein into which the top of the pin, shaped like a piston head, is placed. Vertical motion of the wheel and corresponding motion of the pin cause hydraulic fluid to be expelled from or drawn into the chamber. The chambers of the wheels on opposite sides of the frame are in communication with each other. Consequently, as one wheel rises, the other is forced downward by the compensating hydraulic fluid, and vice-versa, to attain a level compensation effect.

5 Claims, 2 Drawing Sheets

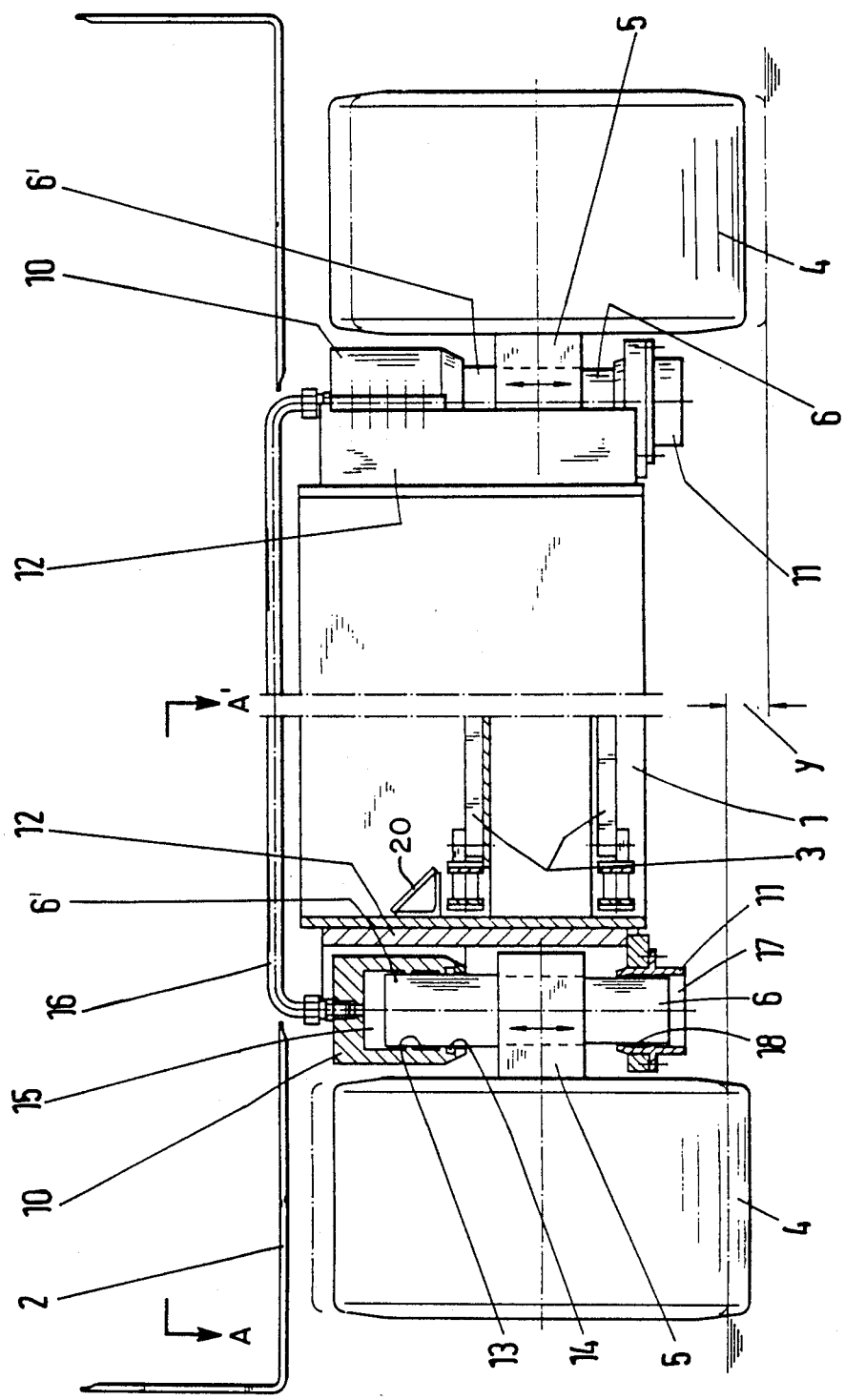

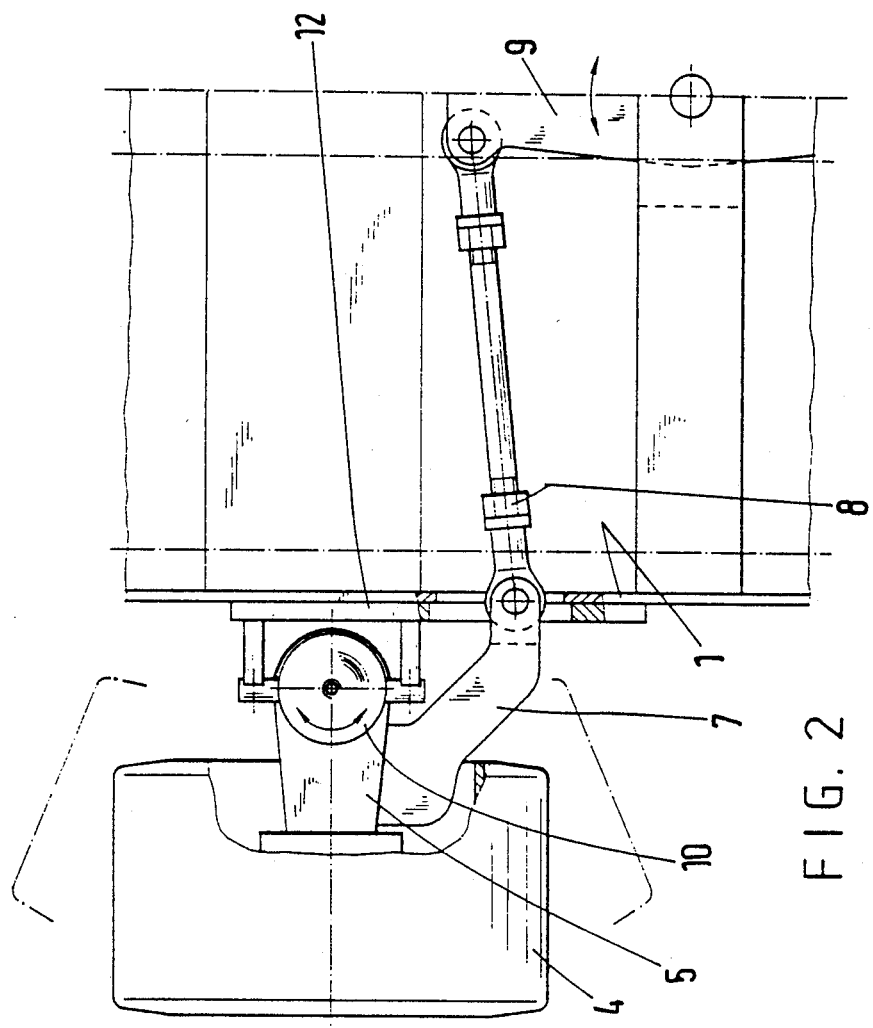

ROAD-FINISHING MACHINE

BACKGROUND OF THE INVENTION

The present invention is directed to a road-finishing machine for laying a road-finishing material on a prepared surface in an even, uniform, and level manner and, in particular, to such a road-finishing machine having, for example, one directional wheel on each side and being provided with level compensation which does not rely on having the directional wheels coupled to a rocker extending transversely to the direction of travel.

Road-finishing machines fitted with a wheeled undercarriage have a set of driving wheels for providing motive power as well as a set of directional wheels for enabling a change in direction. Some versions of such a road-finishing machine have two directional wheels on each side, while other versions typically have only one directional wheel on each side. The road-finishing material is retained in a bucket from which the material is transported to a laying beam by a scraper belt. In order to facilitate formation of a smooth roadway, the road-finishing material must be applied in an even and level manner. Consequently, the road-finishing machine includes some type of level compensation arrangement which maintains the frame of the road-finishing machine level even though the wheels move vertically as they encounter bumps or holes. In the arrangement having two directional wheels on each side, good automatic leveling characteristics, as well as uniform load distribution on the directional wheels, are attained by engaging the two directional wheels on each side in a common rocker which operates longitudinally to the direction of travel. If, however, the road-finishing machine has only one directional wheel on each side, these are usually connected rigidly to the road-finishing machine frame, i.e. without level compensation. However, level compensation for a road-finishing machine having only one directional wheel on each side is available in the prior art by mounting the two directional wheels (i.e. on opposite sides of the frame) in a common rocker which is arranged transversely to the direction of travel.

In order to minimize loading difficulties for the road-finishing machine, the bucket floor must be positioned as close as possible to the roadway. On the other hand, sufficient ground clearance for the road-finishing machine must also be provided. Consequently, little room is available for anything which must be placed below the bucket. The scraper belt is positioned in this area. When a transverse rocker is used, it must fit between the upper and lower portions of the scraper belt as the rocker extends transversely from one side of the road-finishing machine to the other.

The transverse rocker must have large lever arms having very high resistance moments. It must withstand forces applied when the bucket is loaded by rear dumper trucks which, as they unload, support themselves partially on the bucket floor, depending on the projection of the loading surface, so that the rear wheels of the truck can, in fact, be up in the air. Strength of the rocker is related to its size. It must be made bigger in order for it to be stronger. However, the requirement for a very strong transverse rocker conflicts with the very limited amount of space available to accommodate it. For this reason, a transverse rocker is dispensed with if possible. If the transverse rocker is eliminated, however, no level compensation is provided for the road-finishing machine.

Level compensation is very important, particularly when only two directional wheels in total are provided, because of the small contact surface with the roadway resulting from having one wheel being out of contact therewith. Furthermore, if one of the two directional wheels is heavily loaded in comparison to the other, it will sink into the relatively loose roadway subsoil. This creates not only unevenness in the surface being laid because of the roadway subsoil being pushed up in the area of the periphery of the sunken directional wheel, but also results in the possibility of the other directional wheel having no ground contact whatsoever because it is lifted up in the air.

SUMMARY OF THE INVENTION

A primary object of the present invention is to provide a road-finishing machine having an effective level compensation arrangement which is compatible with the typical structure and dimensions of the other components thereof.

A more specific object of the present invention is to provide a road-finishing machine having a level compensation arrangement which does not require a transversely extending rocker.

Yet another object of the present invention is to provide a level compensation arrangement for a road-finishing machine which does not require a rocker extending in the longitudinal direction of travel of the machine.

Still another object of the present invention is to provide a road-finishing machine having a level compensation arrangement which is relatively compact, simple, easy to assemble, and yet effective.

These and other objects of the present invention are attained by, in a road-finishing machine, a level adjustment arrangement to maintain the road-finishing machine level, comprising a frame with a cylinder housing being secured, respectively, to each side of the frame and having a vertical bore therein with a downwardly facing opening. A pin having a piston-shaped upper end is slidably accommodated, respectively, within the bore of the cylinder housing. A means is provided to secure a lower end of the pin, respectively, to each side of the frame so as to enable movement along and around a longitudinal axis of the pin. A chamber in each of the cylinder housings is defined by the bore and the piston. A hydraulic line communicates the chamber on one side of the frame with the chamber on the other side of the frame. Hydraulic fluid fills the chamber in both cylinder housings and the hydraulic line. A means is provided for coupling a directional wheel, respectively, to each of the pins to enable rotation of the directional wheel around the longitudinal axis of the pin and to transmit vertical motion of the directional wheel to the piston. The pin is positioned within the cylinder housing to have its upper end normally spaced from an upper wall of the chamber. Consequently, vertical displacement of one directional wheel is transmitted via the hydraulic fluid to the other directional wheel to cause an equal and opposite displacement thereof.

BRIEF DESCRIPTION OF THE DRAWINGS

FIG. 1 shows an elevational front view, partially in section, of the undercarriage portion of a road-finishing machine with its two directional wheels.

FIG. 2 shows a view taken along line A—A' in FIG. 1, and showing a steering arm not depicted in FIG. 1.

DETAILED DESCRIPTION OF THE PREFERRED EMBODIMENT

FIG. 1 depicts a road-finishing machine having a frame 1. Bucket 2 for holding road finishing material is supported on frame 1 by conventional means (not shown) which securely retain it in position thereabove. A scraper chain belt is shown having links in upper portion 3a and lower portion 3b which are, of course, connected to form an endless loop. As the scraper chain belt rotates, it feeds road finishing material from bucket 2 to a laying beam (not shown). Inclined guide 20 channels the road finishing material from bucket 2 onto the scraper chain belt. Guide 20 is attached to frame 1 in position to prevent any road finishing material from dropping off to the side of the belt.

Two directional wheels 4 are coupled to frame 1 installed in position below bucket 2. A stub axle 5 extends horizontally from each directional wheel 4 toward frame 1. A vertical steering pin 6 is fixed to each of the horizontal stub axles 5. Steering pins 6 have their upper end accommodated within a cylinder housing 10 and their lower end within an annular retainer ring 11. Attached to frame 1 on either side thereof is a support fork 12 having its body 12a welded to the frame while arms 12b extend horizontally therefrom on either side of cylinder housing 10. Cylinder housing 10 has projections 10a extending laterally therefrom which are secured to arms 12b of fork 12. Consequently, cylinder housing 10 is firmly attached to frame 1. Likewise, annular retainer 11 is firmly fixed to frame 1 by a suitable means, such as screws (not shown). With vertical steering pin 6 retained within cylinder housing 10 and annular retainer 11, it is free to turn (i.e. swivel) about its longitudinal axis as well as move vertically. Consequently, turning and vertical motion of directional wheel 4 is made possible. Directional wheel 4 can be deliberately turned by virtue of lever 7 having its one end connected to stub axle 5 while its other end is connected to track rods 8 which are, in turn, connected to a steering arm 9.

Cylinder housing 10 is configured as a hydraulic cylinder. It has a smooth internal bore including a sliding guide packing 13 for piston rod 6' which is formed at the top of steering pin 6. Seal 13 is also used as a sliding guide bearing for piston rod 6'. Seal ring 14 is seated in cylinder housing 10 in sealing contact with steering pin 6. A chamber 15 is defined in cylinder housing 10 by its internal bore and the piston rod 6'. Chamber 15 is filled with oil and is in communication via a compensating pipe 16 with chamber 15 of the hydraulic cylinder housing 10 located on the opposite side of the road-finishing machine.

Both of chambers 15 and pipe 16 are filled with oil. Thus, as one directional wheel is forced upward by a bump of height Y/2, piston rod 6' will contract the size of chamber 15 thereby expelling an amount of oil from chamber 15 which will be transferred via pipe 16 to its counterpart chamber 15. Consequently, the opposite directional wheel will be forced downward by an equal distance Y/2 to thus maintain the level of the road-finishing machine constant. Conversely, if one directional wheel encounters a hole, piston rod 6' will drop within cylinder housing 10 thereby enlarging the size of chamber 15. The consequent drop in pressure will draw more oil into that chamber 15 from the opposite chamber 15 thereby raising opposed directional wheel 4 to, again, maintain the level of the road-finishing machine constant.

Assembly of the undercarriage involves attachment of cylinder housing 10 to frame 1 via fork 12. Once this attachment is made, the directional wheel 4 is placed in position, with vertical pin 6 being inserted into the cylinder 10. Afterwards, retainer ring 11 is brought from underneath vertical pin 6 and, once the latter is inserted thereinto, the retainer ring 11 is fixed to frame 1. Consequently, steering pin 6 is secured in its above-described position.

As shown at the bottom of FIG. 1, an amount of level compensation Y can be provided. In other words, one directional wheel can move upward by ½ Y while the other can simultaneously move downward by ½ Y. With oil chambers 15 of the two directional wheels 4 being in communication, an effective, responsive, and compact level compensation arrangement is provided. Steering pin 6 permits not only the swivelling of its directional wheel, but also doubles in its capacity as a piston to provide the above-described level compensation effect.

Although the above-described arrangement contemplates the utilization of only one directional wheel 4 on each side of the road-finishing machine, the present invention can also be utilized with an arrangement having two directional wheels on each side. With such a configuration, the hydraulic cylinder housing 10 of both directional wheels located longitudinally to the direction of travel, one behind the other, are connected to each other by means of a compensating pipe. Consequently, a level compensation between directional wheels 4 on the same side of the road-finishing machine is also attained in order to provide further improved characteristics.

Although a preferred embodiment of the present invention has been described in detail above, various modifications thereto will be readily apparent to one with ordinary skill in the art. All such modifications are clearly within the scope of the present invention as defined by the following claims.

I claim:

1. In a road-finishing machine, a level adjustment arrangement to maintain the road-finishing machine level, comprising:

a frame;

two cylinder housings secured, respectively, to two opposed sides of the frame, and each of said cylinder housings having a vertical bore therein with a downwardly facing opening;

two vertically extending pins each having a piston-shaped upper end slidably accomodated, respectively, within the bore of said cylinder housings;

means to secure a lower end of said pins, respectively, to each of the sides of said frame for enabling movement of said pins along and around a respective vertical axis of said pins;

a chamber in each of said cylinder housings defined, respectively, by said bore and said piston-shaped upper end of the pins;

a hydraulic line communicating the chamber on one of the opposed sides of the frame with the chamber on the other side of the frame;

hydraulic fluid filling the chamber in both said cylinder housings and the hydraulic line; and means for coupling two directional wheels, respectively, to said pins to enable rotation of said directional wheels around the respective longitudinal axes of the pins and to transmit vertical motion of the directional wheels to a respective one of the piston-shaped upper end of said pins, each of said pins being positioned within said respective cylinder housings to have its upper end normally spaced from an upper wall of said chambers;

whereby vertical displacement of a directional wheel is transmitted via the hydraulic fluid to the other directional wheel to cause an equal and opposite displacement thereof.

2. The road-finishing machine of claim 1, further comprising a sealing ring between the cylinder housings and said piston-shaped upper end of said pins respectively.

3. The road-finishing machine of claim 1, further comprising a sliding bearing between the cylinder housings and said piston-shaped upper end of said pins respectively.

4. The road-finishing machine of claim 1, wherein the securing means comprises two retainer rings having an opening extending through each of said rings for accomodating the lower end of said pins respectively.

5. The road-finishing machine of claim 1, wherein the securing means comprises a sliding bearing for guiding said lower end of each of said pins.

* * * * *